(12) United States Patent
Kobayashi et al.

(10) Patent No.: US 6,394,629 B1
(45) Date of Patent: May 28, 2002

(54) FLASH LIGHT EMISSION APPARATUS AND METHOD FOR ADJUSTING THE SAME

(75) Inventors: Motoaki Kobayashi, Mitaka; Toshifumi Nakano, Sagamihara, both of (JP)

(73) Assignee: Olympus Optical Co., Ltd., Tokyo (JP)

(*) Notice: Subject to any disclaimer, the term of this patent is extended or adjusted under 35 U.S.C. 154(b) by 0 days.

(21) Appl. No.: 09/568,120

(22) Filed: May 10, 2000

(30) Foreign Application Priority Data

May 21, 1999 (JP) .......................................... 11-141494

(51) Int. Cl.[7] ............................ F21V 19/02; F21V 23/04
(52) U.S. Cl. ........................ 362/394; 362/288; 362/419
(58) Field of Search ................................ 362/3–5, 285, 362/287, 288, 394, 395, 418, 419, 425, 427–429; 396/157; 356/123, 218, 224, 226, 229, 232, 121, 122

(56) References Cited

U.S. PATENT DOCUMENTS

| | | | | |
|---|---|---|---|---|
| 3,894,804 A | * | 7/1975 | Detwiler et al. ............. | 356/123 |
| 4,797,796 A | * | 1/1989 | Eastman, II et al. ......... | 362/428 |
| 5,050,044 A | * | 9/1991 | Shibayama .................. | 362/285 |
| 5,099,112 A | * | 3/1992 | Kamitani et al. ......... | 250/201.6 |
| 5,379,204 A | * | 1/1995 | Paterson ...................... | 362/285 |
| 5,486,886 A | * | 1/1996 | Vaynshteyn .................. | 362/285 |
| 5,818,597 A | * | 10/1998 | Hibbard et al. .............. | 356/218 |
| 5,999,749 A | | 12/1999 | Kobayashi et al. .......... | 396/106 |

FOREIGN PATENT DOCUMENTS

| | | |
|---|---|---|
| JP | 63-58420 | 3/1988 |
| JP | 10-311944 | 11/1998 |

\* cited by examiner

*Primary Examiner*—Alan Cariaso
(74) *Attorney, Agent, or Firm*—Frishauf, Holtz, Goodman, Langer & Chick, P.C.

(57) ABSTRACT

Light from a flash discharge tube is reflected in a forward direction by a concave mirror and further refracted to a negative direction by a projection lens. A trigger wire for triggering the flash discharge tube to set off emission is constructed of an elastic material. The flash discharge tube is retained, as an integrated combination, by a discharge tube mounting frame on which support axial parts are provided in a protruding manner, and these support axial parts are slidably and swingably fitted with slide slots of the casing which are provided along the optical axis, so that the flash discharge tube is arranged to be displaceable both in a direction of the optical axis of the flash light emission apparatus and at least in one direction in a plane perpendicular to the optical axis with respect to a relative position thereof to the concave mirror.

10 Claims, 3 Drawing Sheets

FLASH LIGHT EMISSION APPARATUS AND METHOD FOR ADJUSTING THE SAME

CROSS-REFERENCE TO RELATED APPLICATIONS

This application claims benefit of Japanese Application No. 11-141494; filed May 21, 1999; the contents of which are incorporated by this reference.

BACKGROUND OF THE INVENTION

The present invention relates to a flash light emission apparatus with the use of a flash discharge tube of light bulb shape.

For the flash light emission apparatus, the Japanese Patent Application KOKAI Publication No. 63-58420 discloses an apparatus capable of changing the illuminating angle in response to change in the angle of view of a zoom lens by moving the position of a flash part of the flash discharge tube of light bulb shape backward and forward in a direction of the projection of light. This apparatus has a configuration wherein a U-shaped or spiral flash discharge tube is provided movably forward and backward with respect to a central part of a reflector mirror and the flash discharge tube is arranged to be able to move forward or backward by the use of a reciprocating mechanism, wherein when the flash discharge tube is moved forward, the illuminating angle of light that is projected in a forward direction after the light from the flash light emission apparatus is reflected by the reflector mirror becomes narrow, and when the flash discharge tube is moved backward, the illuminating angle of light becomes wider, and thus the illuminating angle can be changed in response to the change in the angle of view of a zoom lens.

On the other hand, as well known to the those in the art, when a reflector mirror having a cross section defined by a quadric curve, such as an ellipsoid and an parabola, is used, if the center location of the reflector mirror (a focal position) is not adjusted to a center of a light emitting part of the flash discharge tube, the luminous intensity distribution that is obtained with the reflector mirror and the discharge tube will be changed for the worse, disabling the effective use of rays of light from the discharge tube.

Then, to solve the problem, it is possible to align the center location of the light emitting part of the flash discharge tube with the focal position of the reflector mirror by applying such a reciprocating mechanism as disclosed in the above-mentioned Patent Application KOKAI Publication.

By the way, the reflector mirror having a cross section which is defined by an ellipsoid or a quadric curve has another focus at a position in front of the reflector mirror depending on the characteristic of its cross section. Therefore, reflected light reflected by the reflector mirror converges at the front focus and diffuses in an area farther than that position. Therefore, when an object stands farther than the above-mentioned front focal position, this reflected light cannot have an effect as auxiliary light.

Moreover, since the flash discharge tubes are mass production goods, the center location of the light emitting part will scatter with respect to its external shape. Therefore, even if the center location of the light emitting part is adjusted by applying such a reciprocating mechanism as disclosed in the above-mentioned Patent Application KOKAI Publication, the adjustment can have an effect only in a direction of the optical axis and hence the adjustment cannot cope with such dispersion, resulting in inconstant luminous intensity distribution from tube to tube. In order to have a constant luminous intensity distribution without dispersion even when adopting a configuration as is disclosed in this Patent Application KOKAI Publication, it is necessary to use a selected flash discharge tube such that a center of its light emitting part is not out of a geometrical center of its external shape, hence resulting in an extremely large cost for the apparatus.

BRIEF SUMMARY OF THE INVENTION

This invention is devised in consideration of the above-mentioned drawback and it is the object of the present invention to provide the flash light emission apparatus that has a configuration whereby internal reflected light can be used effectively as the auxiliary light.

Moreover, it is the further object of the present invention to provide the flash light emission apparatus which is devised to be free from the influence of the variation of the center locations of the light emitting parts of the flash discharge tubes.

According to a first aspect of the present invention there is provided a flash light emission apparatus comprising:
  a flash light emitting tube for emitting light;
  a reflecting member for reflecting the light from the flash light emitting tube in a forward direction, the reflecting member being constructed to have a concave mirror; and
  a trigger member for triggering the flash light emitting tube to set off emission, the trigger member being constructed with an elastic material having a resilient force that presses itself so as to abut constantly against the surface of the flash light emitting tube.

According to a second aspect of the present invention, there is provided a flash light emission apparatus comprising:
  a flash light emitting tube for emitting light;
  a reflecting member for reflecting the light from the flash light emitting tube in a forward direction, being constructed to have a concave mirror, on which an insertion hole for the flash light emitting tube to be inserted and protruded forwardly is formed in a central part of a rear end of the reflecting member, on an optical axis of the flash light emission apparatus;
  a trigger member for triggering the flash light emitting tube to set off the emission, the trigger member being constructed with an elastic material so as to press itself to the direction to abut constantly against the flash light emitting tube; and
  a retention mechanism for retaining the flash light emitting tube in such a condition that its light emitting part locates in a forward position, on the optical axis, so that the relative position of the flash light emitting tube with respect to the reflecting member becomes displaceable both in the direction of the optical axis and at least in one direction in a plane perpendicular to the optical axis and also making it possible for the flash light emitting tube to be displaced at least in the mutually-independent two directions simply by applying the amount of force necessary for the displacement on one portion, wherein
  the retention mechanism includes:
    a retention member for retaining the flash light emitting tube as an integrated combination, being disposed in the rear of the rear end of the reflecting member, on which support axial parts are provided in a protruding manner; and a main body member provided with slide slots extending along the direction of the optical axis so that the support axial parts are slidably and swingably fitted therewith.

According to a third aspect of the present invention, there is provided a method for adjusting a flash light emission apparatus including: a flash discharge tube; reflecting means for reflecting the light from the flash discharge tube in a forward direction, being provided in the rear of the flash discharge tube; and a trigger wire for triggering the flash discharge tube to set off the emission, having a resilient force that presses itself to the direction to abut against the surface of the flash discharge tube, the method comprising the steps of:

displacing the relative position of the flash discharge tube with respect to the reflecting means by a predetermined amount repeatedly both in the direction of an optical axis of the flash light emission apparatus and at least in one direction in a plane perpendicular to the optical axis by applying the amount of displacement force only on one portion of a retention mechanism for retaining the flash discharge tube;

setting off the flash discharge tube to emit light by triggering it to start the emission with the trigger wire at each time when displacement of the predetermined amount is executed and then reflecting the light mainly in a direction of the optical axis with the reflecting means;

sensing the light with detecting means at a predetermined position; and finding a position at which a peak is detected with the detecting means.

According to a fourth aspect of the present invention, there is provided a method for adjusting a flash light emission apparatus including: a flash discharge tube; reflecting means for reflecting the light from the flash discharge tube in a forward direction, being provided in the rear of the flash discharge tube; and a trigger wire for triggering the flash discharge tube to set off the emission, having a resilient force that presses itself to the direction to abut against the surface of the above mentioned flash discharge tube, the method comprising the steps of:

disposing a microscope in front of the flash light emission apparatus and at the center location thereof, on an optical axis of the flash light emission apparatus, and aligning an in-focal point of the microscope with the position of the focal position by design of the reflecting means beforehand; and aligning the center location of the arc of the flash discharge tube with the focal position of the reflecting means through displacing the relative position of the flash discharge tube with respect to the reflecting means both in the direction of the optical axis of the flash light emission apparatus at least in one direction in a plane perpendicular to the optical axis by applying the amount of displacement force only on one portion of a retention mechanism for retaining the flash discharge tube while observing the center location of the arc of the flash discharge tube with the microscope.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
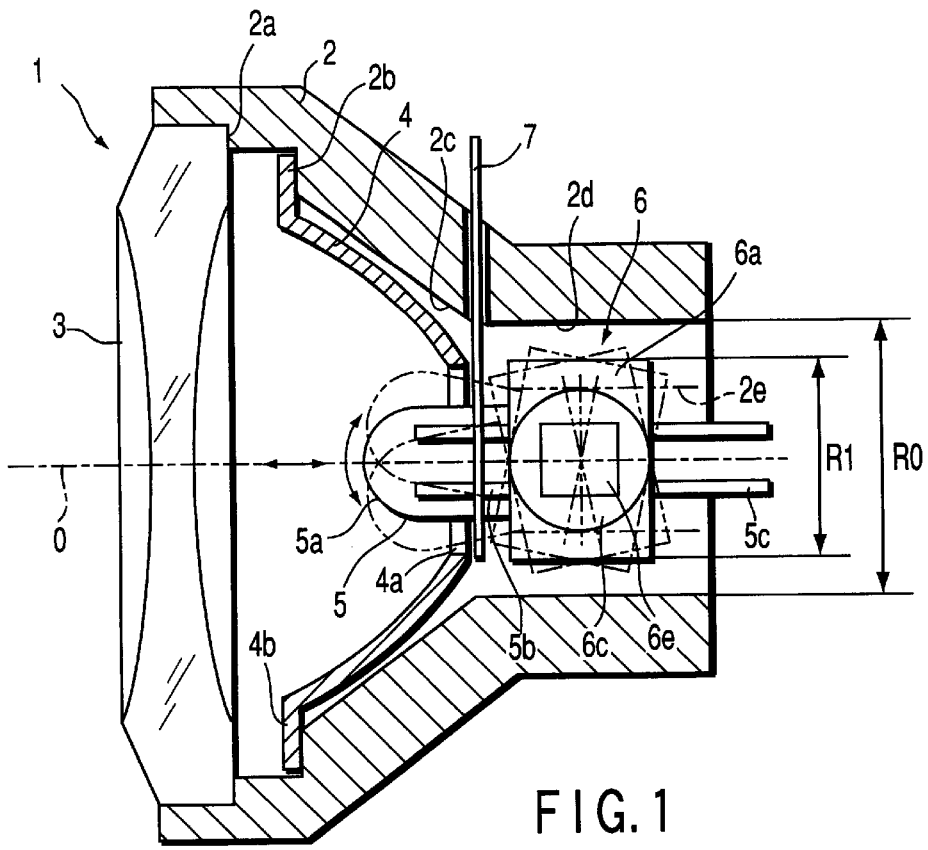
FIG. 1 is a cross section of one embodiment of a flash light emitting apparatus according to the present invention, taken along the optical axis thereof.
Figure 2:
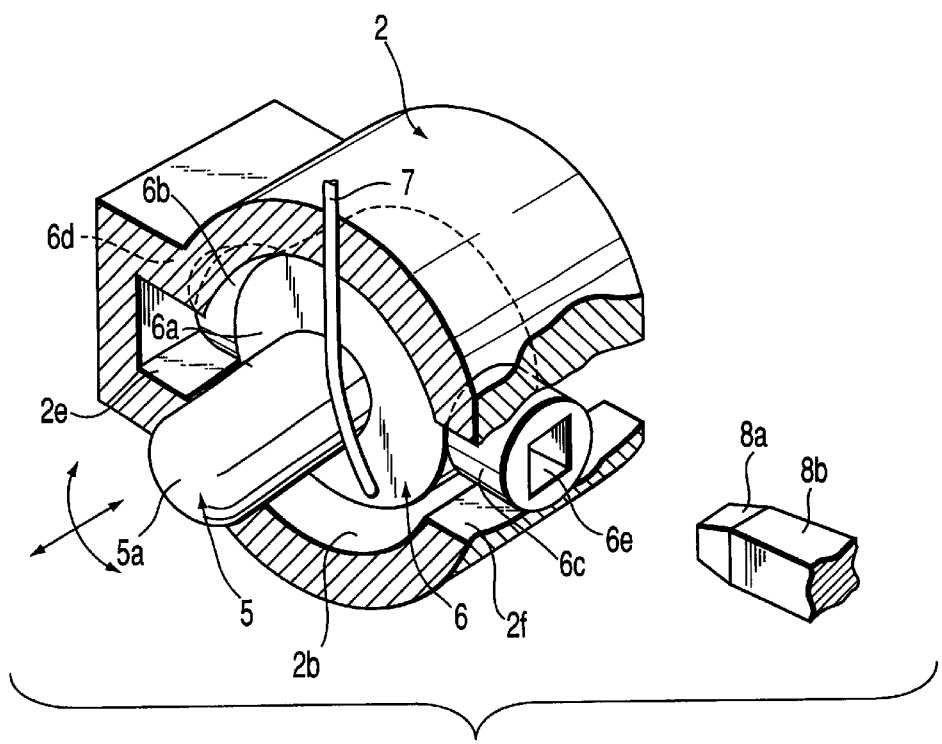
FIG. 2 is a slant view, taken partly in cross section, of a main part of the flash light emission apparatus of FIG. 1.

Hereinafter, one embodiment of the flash light emission apparatus according to the present invention will be described referring to FIGS. 1 and 2.

This flash light emission apparatus 1 is constructed with a projection lens 3, a concave mirror 4 serving as reflecting means (reflecting member), a light bulb-shaped flash discharge tube 5 serving as the flash light emitting tube, a discharge tube mounting frame 6 serving as the retention member for retaining this flash discharge tube 5 as an integrated combination, and a trigger wire 7 serving as a trigger member for triggering the flash discharge tube 5 to start the emission, all of which are integrated in a casing 2 of almost tubular shape serving as a main body member.

The casing 2 is a member which composes the retention mechanism of the flash discharge tube 5 and is provided with a recessed shoulder 2a on an inner peripheral surface at its front end with respect to the optical axis O, into which the projection lens 3 is fitted and glued, hence being fixed.

As the projection lens 3, a lens having a negative reflecting power is used. That is, the projection lens 3 is for refracting rays of direct light from the flash discharge tube 5 and rays of reflected light from the concave mirror 4 in negative directions, and arranged so that the rays of light being transmitted to outgo through the projection lens 3 have a necessary angle of luminous intensity distribution.

That is, the rays of light that were emitted to the side of the flash discharge tube 5 are reflected by a reflecting surface of the concave mirror 4. At this time, since the light emitting part of the flash discharge tube 5 is located at the focus of an ellipsoid a part of which forms the concave mirror 4, the rays of light reflected by the concave mirror 4 make their ways to the other focus of the ellipsoid due to the characteristic of the ellipsoid. This focus is at a position in front of the flash light emission apparatus 1. The reflected rays of light enter the projection lens 3 on their ways to the focus in front of this flash light emission apparatus 1 and are refracted with a negative refracting power of this projection lens 3. In this way, the rays of light reflected in directions which all converge to the focus of the flash light emission apparatus by means of the reflector mirror 4 are then refracted in negative directions by means of the projection lens 3, and through this reflection and refraction, the reflected rays of light are projected as the auxiliary light having a necessary angle of luminous intensity distribution.

On the other hand, rays of light that are emitted from the front of the flash discharge tube 5 and enter directly to the projection lens 3, without being reflected by the concave mirror 4, are made to outgo in dispersing directions to the optical axis. At this time, rays of light existing in the vicinity of the center among the rays of light outgo with a necessary angle of luminous intensity distribution as the auxiliary light, which supplement shortfall of the rays of reflected light. By the way, the rays of light existing outside among the rays of direct light go out of the angle of luminous intensity distribution.

In this way, since the auxiliary light that is projected from the flash light emission apparatus 1 comprises the rays of reflected light and the rays of direct light in the vicinity of the optical axial, the auxiliary light, on the whole, is projected with a luminous intensity distribution almost in a circular shape.

Moreover, in an inner peripheral surface which locates slightly in the rear of the shoulder 2a of the casing 2, provided is a next shoulder 2b, on which a flange part 4b provided around the periphery of the front edge of the concave mirror 4 is fixed. This concave mirror 4 is arranged so that its optical axis coincides the optical axis of the projection lens 3, making a common optical axis O. A reflecting curved surface of this concave mirror 4 is formed to a curved surface of an ellipsoid of revolution, a paraboloid of revolution, etc. having a focus (or foci) and the concave mirror 4 is constructed and arranged so as not to contact directly with a diminishing conical taper part 2c of the casing 2 with a slight gap in-between.

A circular hole (insertion hole) 4a is drilled at a rear end of the concave mirror 4, on the optical axis O, and the light emitting part of the flash discharge tube 5 is arranged to protrude through this circular hole 4a.

This flash discharge tube 5 is such that a pair of electrodes 5b (anode and cathode) are constructed and arranged, for example, in upper and lower positions inside a glass bulb 5a of light bulb shape and a rare gas such as xenon etc. is sealed therein. Further, a trigger wire 7 is provided outside this glass bulb 5a and serves to set off discharge between the pair of the electrodes to emit light by applying a high voltage to the trigger wire 7 with the help of a trigger circuit (not shown in the figure). By the way, when the pair of the electrodes 5b are constructed and arranged in upper and lower positions, dispersion of the positions of the light emitting parts occurs mainly in an up-and-down (vertical) direction. The pair of these electrodes 5b are connected to a pair of terminals 5c in an elongated form extending from a rear end of this flash discharge tube 5 and via these terminals 5c the flash discharge tube 5 is connected to an electric circuit and the like (not shown in the figure).

The discharge tube mounting frame 6 is a member that composes the retention mechanism for the flash discharge tube 5 in conjunction with the casing 2, and serves to retain the flash discharge tube 5 by fitting it, as an integrated combination, into the inside of a base part 6a of almost short cylinder shape. This discharge tube mounting frame 6 has a pair of support axial parts 6b, 6c each formed to a cylindrical shape in a protruding manner from the left and right sides of a peripheral surface of the base part 6a, both being on a single axis. Further, a point 6d of the one support axial part 6b is formed to a hemispherical shape and an end face of the other support axial part 6c is formed to have a rectangular hole 6e thereon serving as an engagement hole into which a point 8a of the jig 8 having the shape of, for example, a square pole will fit. By the way, a pair of terminals 5c of the flash discharge tube 5 extends each in an elongated form further backwardly from the rear face of this base part 6a.

The diminishing conical taper part 2c of the casing 2 leads to a reduced-radius tubular part 2d at its rear side, where the base part 6a of the discharge tube mounting frame 6 is constructed and arranged with a predetermined gap being set to the reduced-radius tubular part 2d. That is, an inner radius R0 of the reduced-radius tubular part 2d and an outer radius R1 of the base part 6a are set to satisfy the inequality $$R0 > R1$$

and, as mentioned below, so as to secure a necessary and sufficient space for the discharge tube mounting frame 6 retaining the discharge tube 5 to swing.

In addition, at the left and right sides of the reduced-radius tubular part 2d, provided in parallel to the optical axis O are slide slots 2e, 2f with which the support axial parts 6b, 6c are slidably fitted. The flash discharge tube 5 and the discharge tube mounting frame 6 are retained to the casing 2 only by means of the fitting between these support axial parts 6b, 6c and the slide slots 2e, 2f and no other portions contact with the casing 2.

Further, the trigger wire 7 is constructed with a spring member consisting of an electrically conductive wire, and its one end is fixed to the casing 2 and its other end is arranged freely in a space between the concave mirror 4 and the discharge tube mounting frame 6, being unrestrained in resilient displacement; however, the other end of the trigger wire 7 is prevented from displacing along the direction of the optical axis O with respect to the casing 2 but allowed to displace in a plane almost perpendicular to the light emission axis of the flash light emission apparatus. In other words, the direction of the application of a resilient force on the other end of this trigger wire 7 is a direction to abut against the surface of the flash discharge tube 5. Therefore, by providing such a trigger wire 7 at such a position, even when the flash discharge tube 5 is adjusted to be at any position, the trigger wire 7 keeps constantly an abutting condition against the flash discharge tube 5, so that the emission of the flash discharge tube 5 can be assured.

Figure 3:
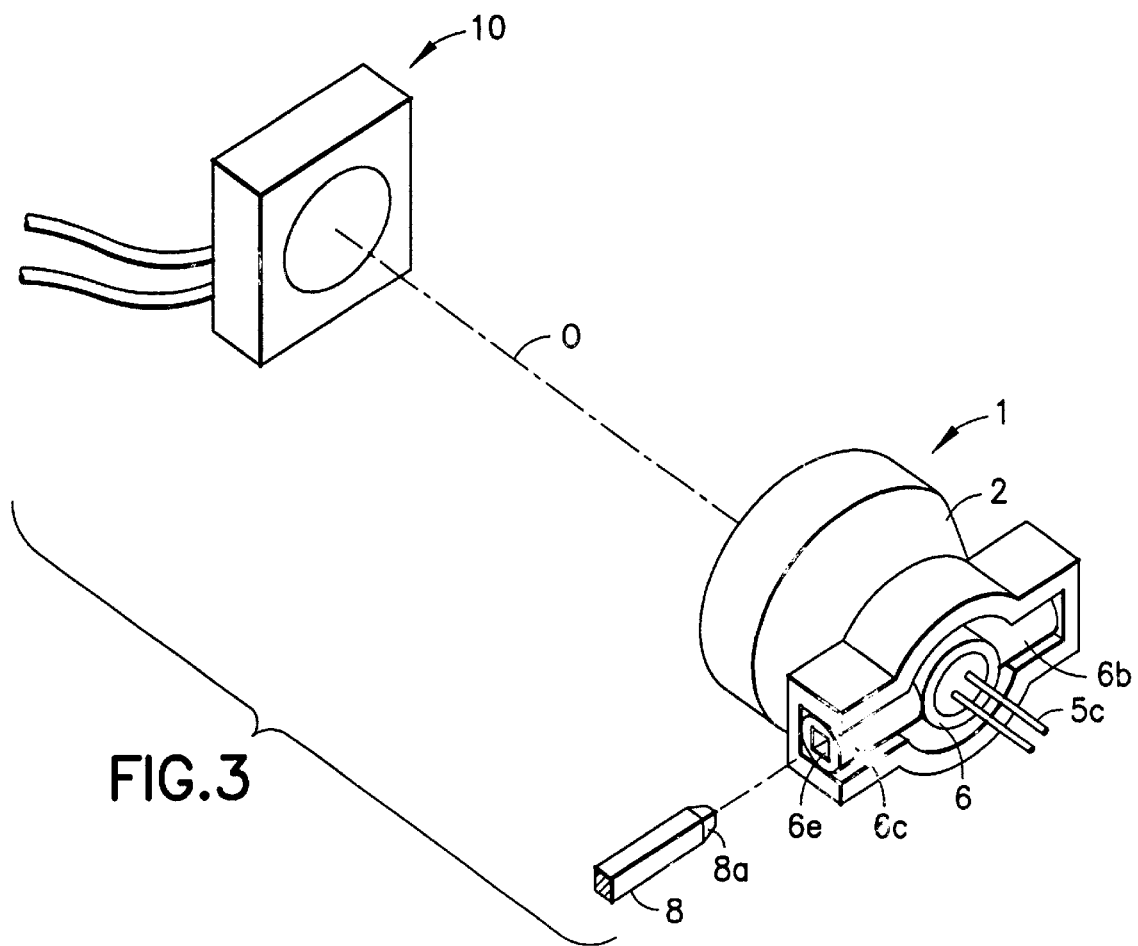
FIG. 3 shows a first structure for effecting an. adjustment according to the present invention.

Next, adjustment of the position of the flash discharge tube 5 in the flash light emission apparatus 1 having such a configuration will be described, in accordance with FIG. 3.

That is, the flash light emission apparatus 1 constructed as described above is mounted on an adjustment device (not shown in FIG. 3) and a sensor 10 which serves as the detecting means for measuring the illuminance of the light from this flash light emission apparatus 1 is arranged at a predetermined position.

Under this condition, the flash discharge tube 5 is triggered to emit light and the illuminance of the light is measured with the sensor. Subsequently, the point 8a of the jig 8 is fitted into the rectangular hole 6e of the discharge tube mounting frame 6. Next, by applying the amount of force on the jig 8 to effect the sliding of the jig 8 in parallel to the optical axis O by the predetermined amount, the discharge tube mounting frame 6 is made to move in parallel to the direction of the optical axis O along the slide slots 2e, 2f by the predetermined amount, and hence the flash discharge tube 5 is made to moved in the direction of optical axis O by the predetermined amount of displacement. By triggering the flash discharge tube 5 to emit light and measuring the illuminance of the light with the sensor at each time when being moved by such predetermined mount of displacement, a position at which the sensor detects a peak is found.

When the peak position has been found in this way, in the next step, by applying a predetermined amount of displacement force on the jig 8 in a direction of its rotation, the discharge tube mounting frame 6, and hence the flash discharge tube 5, are made to swing around the support axial parts 6b, 6c by the predetermined amount of displacement. Thus, by moving the light emitting part of the flash discharge tube 5 up and down in a plane perpendicular to the optical axis O by the predetermined amount of displacement, triggering the flash discharge tube 5 to emit light at each time when being moved by the such predetermined amount of displacement, and measuring the illuminance of the light with the sensor, a position at which the sensor detects a peak is found.

As described above, since in this case the electrodes 5b are arranged in upper and lower positions with respect to the base part 4a when the flash light emission apparatus 1 is viewed from the front face thereof in the direction of the optical axis O, the dispersion of locations of the light emitting parts is mainly in the vertical direction, and therefore the adjustment of the position may be finished at this stage. However, when a further fine adjustment is to be performed or in the case where the dispersion of the positions of the light emitting parts is in the left-and-right (horizontal) direction because the electrodes 5b are arranged in left and right positions with respect to the base part 4a, a further adjustment of its position in this horizontal direction is performed.

That is, when the amount of displacement force for rotating the jig 8 in the horizontal direction is applied almost about a pivotal point where the center line of the said jig 8 and the optical axis O intersect, the position of the light emitting part is moved rightward or leftward in a plane perpendicular to the optical axis O. Then, by triggering the flash discharge tube 5 to emit light at each time when being rotated by the predetermined amount of rotation and measuring the illuminance of the light with the sensor, a position at which the sensor detects a peak is found and the flash discharge tube 5 is fixed at that position.

In this way, by adjusting the position of the flash discharge tube 5 with respect to the concave mirror 4 both in the direction of the optical axis O and at least in one direction in a plane perpendicular to this optical axis O, an optimum peak position can be found.

After that, when the position of the flash discharge tube 5 in the flash light emission apparatus 1 is optimized, the flash light emitting tube 5 is fixed at that position by applying an adhesive between the discharge tube mounting frame 6 and the casing 2 and curing it or the like. That is all what is needed for the adjustment.

By the way, in the foregoing, described is a case where the discharge tube mounting frame 6 is adjusted sequentially: in the optical axis direction, in the vertical direction, and in the horizontal direction. However, in an actual fabrication process, these adjustments are performed simultaneously to detect the most suitable peak position.

Figure 4:
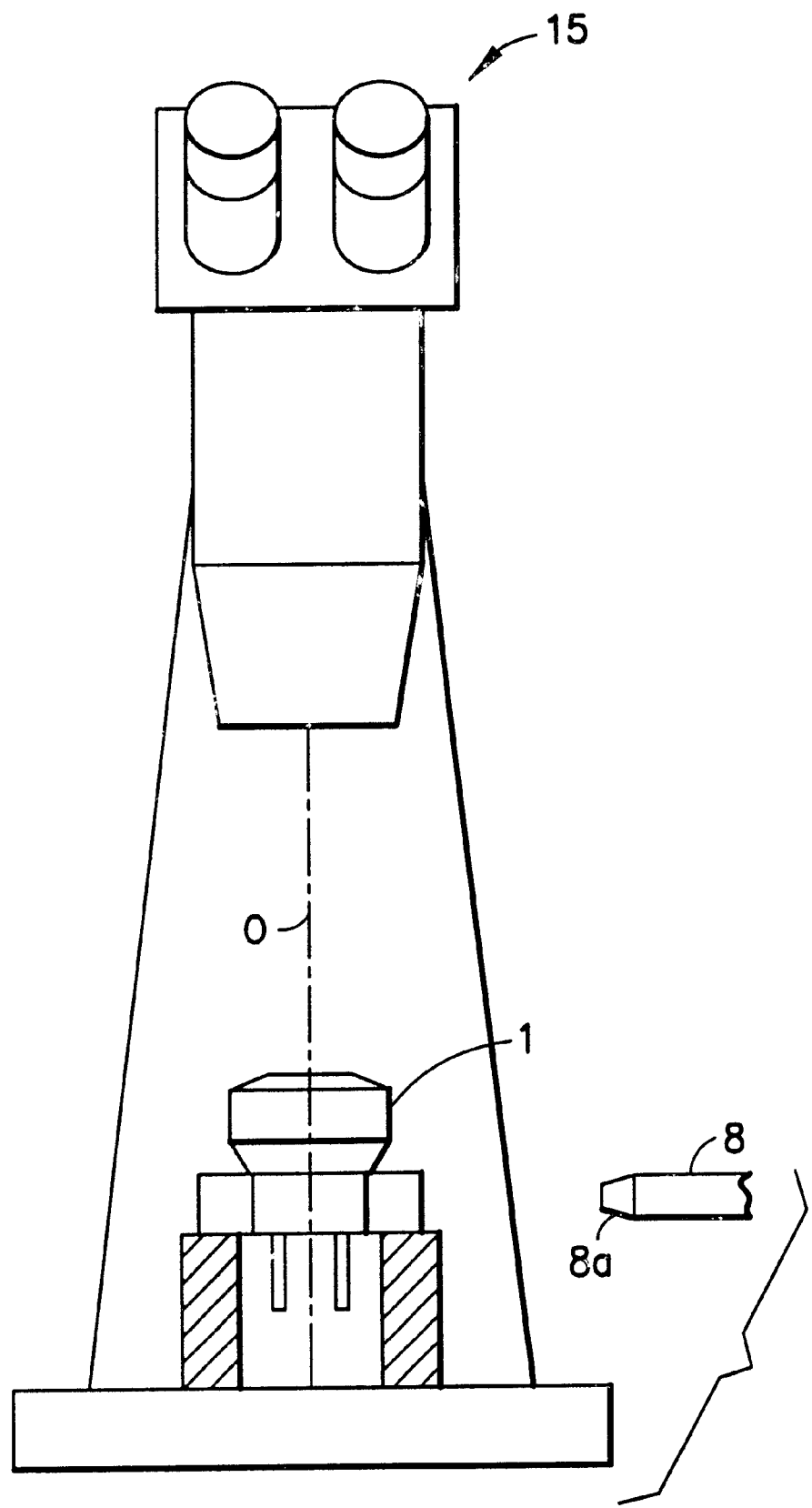
FIG. 4 shows a second structure for effecting an adjustment according to the present invention.

Moreover, for an adjustment method other than the adjustment method with the use of a sensor as described above, there exists a method where a microscope is used, as will be described in accordance with FIG. 4.

That is, a microscope 15 is disposed in front of the projection lens 3 at the center location thereof, on the optical axis, and an in-focus position of this microscope is adjusted to a focal position by design of the concave mirror 4 beforehand. Then, by fitting the point 8a of the jig 8 into the rectangular hole 6e of the discharge tube mounting frame 6 and applying the amount of displacement force on the jig 8 to effect the sliding of the jig 8 in parallel to the direction of the optical axis O, the discharge tube mounting frame 6 is made to move in parallel to the direction of the optical axis O along the slide slots 2e, 2f and hence the flash discharge tube 5 is made to move in the direction of the optical axis O, and accordingly the light emitting part of the flash discharge tube 5, namely the center location of the arc, is made to move to a focal position satisfying an in-focus condition.

In addition, with respect to directions vertical to the optical axis, by applying the amount of force in the rotational direction on the jig 8, the discharge tube mounting frame 6, and hence the flash discharge tube 5 are made to swing about the support axial parts 6b, 6c and thereby the center location of the arc of the flash discharge tube 5 is made to move upward and downward in a plane perpendicular to the optical axis O; and further, if necessary, by applying the amount of force that rotates the discharge tube mounting frame 6 in the horizontal direction about a pivotal point where the center line of the jig 8 and the optical axis O intersect, the center location of the arc of the flash discharge tube 5 is made to move leftward and rightward in a plane perpendicular to the optical axis O; and consequently the optical axis of the projection lens 3 and the center location of the arc of the flash discharge tube 5 are adjusted so as to coincide with each other.

Thus, when the position of the flash discharge tube 5 inside the flash light emission apparatus 1 is optimized, the flash discharge tube 5 is fixed at that position by applying an adhesive between the discharge tube mounting frame 6 and the casing 2 and curing it or the like.

By the way, in the foregoing, the description is made for a case where the adjustment is performed sequentially: in the direction of the optical axis, in the vertical direction, and in the horizontal direction. However, in an actual manufacturing process, these adjustments are to be conducted simultaneously to perform alignment at an optimum point.

According to one embodiment of the present invention as described in the foregoing, since the rays of light from the flash discharge tube 5 are reflected in a forward direction by the concave mirror 4 and then refracted by the projection lens 3 in negative directions and projected, and hence the rays of light are projected as the auxiliary light having a necessary angle of luminous intensity distribution as a whole through this reflection and refraction, becoming available effectively as the auxiliary light. Further, since the trigger wire 7 for triggering the flash discharge tube 5 to set off the emission is constructed with the elastic material, even when the center location of the emission part of the flash discharge tube 5 is adjusted in the direction of the optical axis of the projection lens 3 in whatever manner in order to align it with the focal position of the concave mirror 4, the trigger wire 7 is kept contact with the flash discharge tube 5, so that the flash light emission can be assured.

Further, according to this one embodiment, by adjusting the flash discharge tube 5 not only in the direction of the optical axis but also in the vertical direction and in the horizontal direction, even such a flash discharge tube that its center location of the arc is out of alignment to the center location of the flash discharge tube 5 can be adjusted to an optimum position where the availability of the light is enhanced and therefore such flash discharge tubes that were hitherto rejected by screening because of insufficient quantity of light now can be used and hence the yield is intended to be improved.

In addition, adjustments in three independent directions can be performed easily only using a single jig 8, whereby a time necessary for the adjustment work can be shortened. Further, since what is necessary to implement the invention is just to secure a small space through which the jig is to be inserted, this invention can be effectively applied to cameras that are aimed at miniaturization.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A flash light emission apparatus comprising:
   a flash light emission tube for emitting light;
   a reflecting member for reflecting the light from said flash light emission tube in a forward direction, said reflecting member being formed to have a concave mirror;
   a trigger member for triggering said flash light emitting tube to set off the emission, said trigger member comprising an elastic material having a resilient force that presses itself so as to abut constantly against a surface of said flash light emitting tube; and
   a retention mechanism for retaining said flash light emitting tube so that a relative position of said flash light emitting tube with respect to said reflecting member becomes displaceable both in a direction of an optical axis of the flash light emission apparatus and at least in one direction in a plane perpendicular to the optical axis, and so that said flash light emitting tube is enabled to be displaced at least in the mutually-independent two directions simply by applying an amount of force necessary for the displacement only on one portion, and
   wherein said trigger member continues to abut against the surface of said flash light emitting tube even when said flash light emitting tube is displaced relative to the reflecting member.

2. The apparatus according to claim 1, wherein said retention mechanism includes:
   a retention member for retaining said flash light emitting tube as an integrated combination, said retention member being provided with support axial parts in a protruding manner; and
   a main body member provided with slide slots extending along the direction of the optical axis with which said support axial parts are fitted so as to be slidable and swingable.

3. The apparatus according to claim 1, wherein said trigger member is a spring member comprising an electrically conductive wire.

4. The apparatus according to claim 2, wherein said trigger member is fixed at a first end while a second end of said trigger member is arranged freely for universal movements so that elastic displacement is set free, so that displacement of said trigger member along a direction of the light emission axis with respect to said main body member is blocked, and so that said trigger member is set to be displaceable in a plane substantially perpendicular to the optical axis of the flash light emission apparatus.

5. A flash light emission apparatus comprising:
   a flash light emitting tube for emitting light;
   a reflecting member for reflecting light from said flash light emitting tube, being formed to have a concave mirror, on which an insertion hole for said flash light emitting tube to be inserted and protruded forwardly is formed in a central part of a rear end of said reflecting member, on an optical axis of the flash light emission apparatus;
   a trigger member for triggering said flash light emitting tube to set off the emission, said trigger member being constructed with an elastic material so as to press itself to the direction to abut constantly against said flash light emitting tube; and
   a retention mechanism for retaining said flash light emitting tube in such a condition that its light emitting part locates in a forward position, on the optical axis, so that the relative position of said flash light emitting tube with respect to said reflecting member become displaceable both in the direction of the optical axis and at least in one direction in a plane perpendicular to said optical axis, and so that said flash light emitting tube is enabled to be displaced at least in the mutually independent two directions simply by applying an amount of force necessary for the displacement on one portion,
   wherein said retention mechanism includes:
      a retention member for holding said flash light emitting tube as an integrated combination, said retention member being disposed behind the rear end of said reflecting member, and said retention member being provided with support axial parts in a protruding manner; and
      a main body member provided with slide slots extending along the direction of the optical axis so that said support axial parts are slidably and swingably fitting therewith.

6. The apparatus according to claim 5, wherein said trigger member is kept in contact with a surface of said flash light emitting tube in a space sandwiched by the rear end of s aid reflecting member and said retention mechanism.

7. A method for adjusting a flash light emission apparatus including: a flash discharge tube; reflecting means for reflecting light from the flash discharge tube in a forward direction, said reflecting means being provided behind th e flash discharge tube; and a trigger wire for triggering the flash discharge tube to set off an emission, said trigger wire having a resilient force that presses itself in a direction to abut against a surface of the flash discharge tube, the method comprising:
   displacing a relative position of the flash discharge tube with respect to the reflecting means by a predetermined amount repeatedly both in a direction of an optical axis of the flash light emission apparatus and at least in one direction in a plane perpendicular to the optical axis by applying an a mount of displacement force only on one portion of a retention mechanism for retaining the flash discharge tube;
   setting off the flash discharge tube to emit light by triggering the flash discharge tube to start the emission with the trigger wire each time when displacement of the predetermined amount is executed and then reflecting the light mainly in a direction of the optical axis with the reflecting means;
   sensing the light with a sensor at a predetermined position; and
   finding a position at which a peak is detected by the sensor.

8. The method according to claim 7, further comprising fixing the flash discharge tube at the position at which the peak was detected by the sensor.

9. A method for adjusting a flash light emission apparatus including: a flash discharge tube; reflecting means for reflecting light from the flash discharge tube in a forward direction, said reflecting means being provided behind the flash discharge tube; and a trigger wire for triggering the flash discharge tube to set off an emission, said trigger wire having a resilient force that presses itself in a direction to abut against a surface of the flash discharge tube, the method comprising:

disposing a microscope in front of the flash light emission apparatus at a center location on an optical axis of the flash light emission apparatus, and aligning an in-focus point of the microscope with a focal position of the reflecting means; and aligning a center location of an arc of the flash discharge tube with the focal position of the reflecting means by displacing a relative position of the flash discharge tube with respect to the reflecting means both in a direction of the optical axis of the flash light emission apparatus and at least in one direction in a plane perpendicular to the optical axis by applying an amount of displacement force only on one portion of a retention mechanism for retaining the flash discharge tube while observing the center location of the arc of the flash discharge tube with the microscope.

10. The method according to claim 9, further comprising fixing a position of the flash discharge tube after aligning the center location of the arc of the flash discharge tube with the focal position of the reflecting means.

* * * * *